Figures 1, 2, 3, 4:
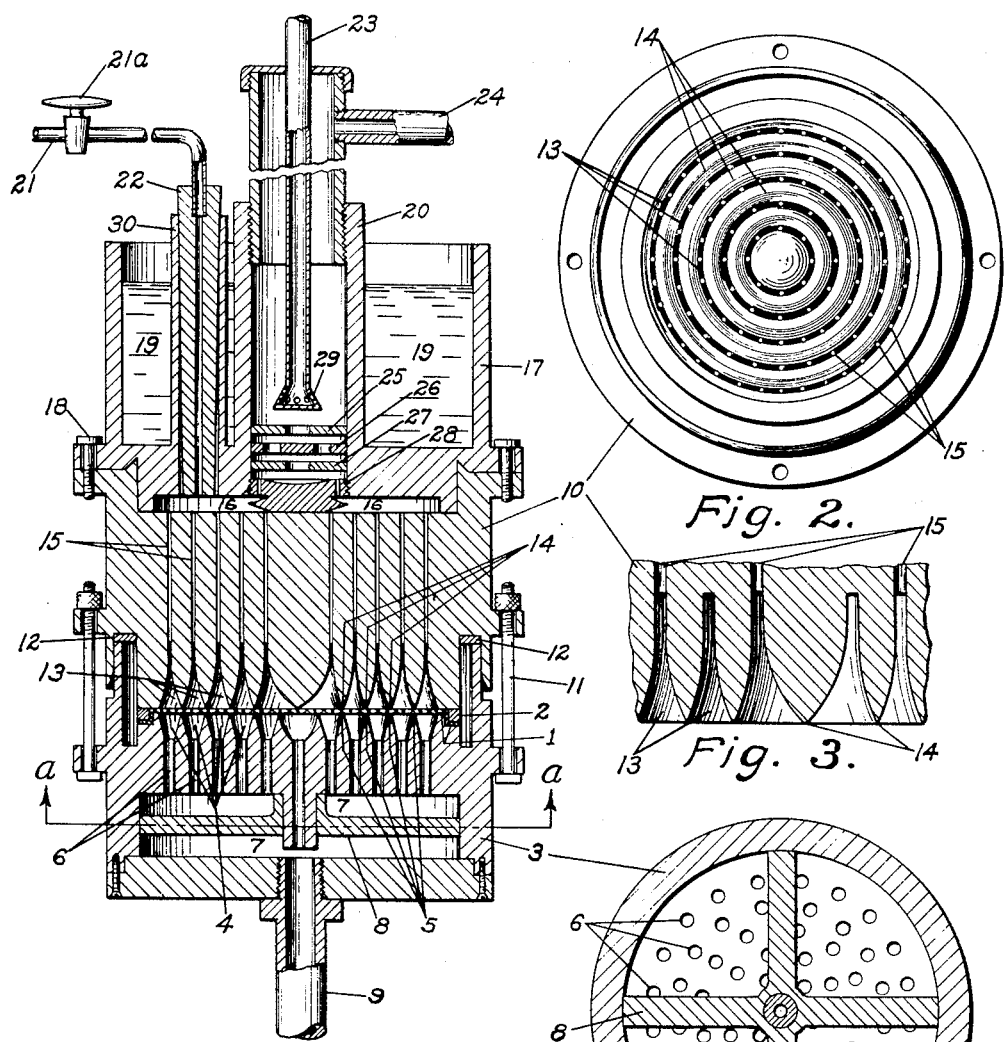

Sept. 8, 1931.　　　　J. Y. YEE　　　　1,821,956
APPARATUS FOR THE OXIDATION OF AMMONIA
Filed June 30, 1928

Inventor
Jew Yam Yee,

By R. W. Williams, C. W. Boyle,
P. D. Cronin and A. J. Decker
Attorneys

Patented Sept. 8, 1931

1,821,956

UNITED STATES PATENT OFFICE

JEW YAM YEE, OF WASHINGTON, DISTRICT OF COLUMBIA

APPARATUS FOR THE OXIDATION OF AMMONIA

Application filed June 30, 1928. Serial No. 289,596.

(GRANTED UNDER THE ACT OF MARCH 3, 1883, AS AMENDED APRIL 30, 1928; 370 O. G. 757)

This application is filed under the act approved April 30, 1928, and the invention herein described may be manufactured and used by or for the Government, for governmental purposes, without the payment to me of any royalty thereon.

The drawings comprise four figures in which Fig. 1 represents a partly cross sectional side view of the entire apparatus; Fig. 2 is a detailed view of the roof member of the catalyst chamber; Fig. 3 is an enlarged view of a portion of the roof member shown in Fig. 2; Fig. 4 is a sectional view taken along the line a—a in Fig. 1.

My apparatus comprises a platinum gauze 1, held in place by a retaining ring 2 on the upper part of the base member 3. Said base member has on its upper surface a series of annular concentric taper grooves 4, the sides of which meet in the sharp edges or apices 5. Ports 6 extend from the apices of the grooves 4 to a chamber 7. Within chamber 7 a heat conducting spider 8 may be provided to carry heat from the central part of the base 3 to the walls of said base. An outlet 9 communicates with chamber 7.

The roof member 10 of my apparatus is secured to the base member by bolts 11 by which it is possible to compress gasket 12 between the two members in order to make the joint gas tight. Member 10 is also provided with a series of annular concentric and tapered grooves 13, the sides of which terminate in apices 14, said apices being positioned directly opposite apices 5 of base member 3. A series of ports 15 leads from apices of grooves 13 to chamber 16. Member 17 is fastened to member 10 by means of screws 18 and is provided with cooling means such as a water jacket 19; and also with a gas inlet 20; gas sampling tube 21, provided with stopcock 21a, and safety tube 22. The gas inlet tube 20 comprises an ammonia inlet tube 23, with outlets 29; an oxygen inlet tube 24 and baffles and deflectors 25, 26 and 27 and 28. Safety tube 22 fits lightly into tube holder 30, and carries on its end aforesaid means 21 and 21a for obtaining gas samples.

The use of the apparatus for the oxidation of ammonia is as follows:—

Member 10 is removed from the base 3 and the platinum gauze 1 heated by means of a gas flame. Member 10 carrying member 17 is then placed on top of member 3 and gauze 1 and the flow of ammonia and oxygen started at the proper rate through inlet tubes 23 and 24, respectively. As the gas mixture passes through the gas inlet tube 20, mixing of the constituents takes place because of the baffles and deflectors 25, 26, 27 and 28, interposed in the tube. The gas passing through ports 15 serves to cool member 10, at the same time being itself preheated before it strikes the catalytic gauze 1. This is a valuable feature of my invention, since this preliminary preheating makes for higher efficiencies of conversion. Combustion of the ammonia then takes place on the platinum gauze, the heat of reaction maintaining the temperature of the gauze at the proper point without additional heat. The oxidized gases leave the gauze 1 via the grooves 4, ports 6, chamber 7, and outlet 9, and proceed thence to any recovery means desirable.

In large installations, it may be desirable to supply base 3 with additional cooling means other than mere radiation and conduction from the walls. This, however, can be provided by well known means which I need not describe.

In regard to materials of construction, I prefer to use a metal of as high a heat conductivity as possible, consistent with its chemical inertness. In the case of the oxidation of ammonia, I have found that aluminum metal is well suited for the purpose, it combining the desirable properties of high heat conductivity with chemical resistance to the action of the nitrous gases.

What I claim is:—

1. In an apparatus for catalyzing reactions of explosive gas mixtures, a catalytic gauze member, roof and base members, said roof and base members being provided with annular, concentric apical rings and grooves, said apical rings being substantially in contact with said gauze member.

2. In an apparatus for catalyzing reactions of explosive gas mixtures, a catalytic gauze member, roof and base members, said roof and base members being provided with annular, concentric apical rings and grooves, gas ports, communicating with the apices of said grooves, said apical rings being substantially in-contact with said gauze member.

3. In an apparatus for catalyzing reactions of explosive gas mixtures, a catalytic gauze member, roof and base members, said roof and base members being provided with annular concentric apical rings and grooves, gas ports, communicating with the apices of said grooves, and being in heat interchange relationship with said roof member.

4. In an apparatus for catalyzing reactions of explosive gas mixtures, gas inlet means, said gas inlet means being provided with a gas mixing device, a catalytic gauze member, roof and base members, said roof and base members being provided with annular concentric apical rings and grooves, said apical rings being substantially in contact with said gauze member.

5. In an apparatus for catalyzing reactions of explosive gas mixtures, gas inlet means, a catalytic gauze member, roof and base members, said roof and base members being provided with annular concentric apical rings and grooves, gas ports communicating with the apices of said grooves and having the apices of the rings in substantial contact with said gauze member.

6. In an apparatus for catalyzing reactions of explosive gas mixtures, gas inlet means, said gas inlet means being provided with a gas mixing device, a catalytic gauze member, roof and base members, said roof and base members being provided with annular concentric apical rings and grooves, said apical rings being substantially in contact with said gauze member, gas ports communicating with the apices of said grooves.

7. In an apparatus for catalyzing reactions of explosive gas mixtures, gas inlet means, said gas inlet means being provided with a gas mixing device, a catalytic gauze member, roof and base members, said roof and base members being provided with annular concentric apical rings and grooves, said edged rings being substantially in contact with said gauze member, gas ports communicating with the apices of said grooves and being in heat interchange relationship with said roof member.

JEW YAM YEE.